United States Patent
Li et al.

(10) Patent No.: US 11,374,653 B2
(45) Date of Patent: Jun. 28, 2022

(54) VISIBLE LIGHT COMMUNICATION TRANSCEIVER AND VISIBLE LIGHT COMMUNICATION SYSTEM

(71) Applicant: University of Science and Technology of China, Anhui (CN)

(72) Inventors: Shangbin Li, Anhui (CN); Zhengyuan Xu, Anhui (CN); Boyang Huang, Anhui (CN)

(73) Assignee: University of Science and Technology of China, Hefei (CN)

( * ) Notice: Subject to any disclaimer, the term of this patent is extended or adjusted under 35 U.S.C. 154(b) by 199 days.

(21) Appl. No.: 16/645,147

(22) PCT Filed: Jun. 7, 2017

(86) PCT No.: PCT/CN2017/087415
§ 371 (c)(1),
(2) Date: Mar. 6, 2020

(87) PCT Pub. No.: WO2018/218697
PCT Pub. Date: Dec. 6, 2018

(65) Prior Publication Data
US 2020/0252128 A1 Aug. 6, 2020

(30) Foreign Application Priority Data
May 31, 2017 (CN) .......................... 201710399665.8

(51) Int. Cl.
*H04B 10/116* (2013.01)
*H05B 45/20* (2020.01)
(Continued)

(52) U.S. Cl.
CPC ........... *H04B 10/116* (2013.01); *H04B 10/43* (2013.01); *H04B 10/502* (2013.01); *H04B 10/54* (2013.01); *H05B 45/20* (2020.01)

(58) Field of Classification Search
None
See application file for complete search history.

(56) References Cited

U.S. PATENT DOCUMENTS 6,208,446 B1 * 3/2001 Faifman ................. H04B 10/69
398/136
7,072,587 B2 * 7/2006 Dietz ..................... G09G 3/3406
398/138
(Continued)

FOREIGN PATENT DOCUMENTS

CN 103281273 A 9/2013
CN 103546214 A 1/2014
(Continued)

OTHER PUBLICATIONS

International Search Report and Written Opinion for International Application No. PCT/CN2017/087415, dated Feb. 24, 2018.

*Primary Examiner* — David W Lambert
(74) *Attorney, Agent, or Firm* — Wolf, Greenfield & Sacks, P.C.

(57) ABSTRACT

Provided is a visible light communication transceiver. A drive amplification module performs digital-to-analog conversion and amplification on a digital modulation signal to obtain a first electrical signal, and transmits the signal to a Bias Tee-like circuit. The Bias Tee-like circuit transmits the first electrical signal to a LED light source. The LED light source performs electrical-to-optical conversion on the first electrical signal to generate a first optical signal and transmits the first optical signal, and performs optical-to-electrical conversion on a received second optical signal to obtain a second electrical signal. The Bias Tee-like circuit obtains the second electrical signal from the LED light source, and transmits the second electrical signal to an adaptive amplification and equalization module. The adaptive equalization module adjusts a gain of the second electrical signal based on an optical power of the first optical signal.

7 Claims, 8 Drawing Sheets

(51) Int. Cl.
  *H04B 10/43* (2013.01)
  *H04B 10/50* (2013.01)
  *H04B 10/54* (2013.01)

(56) References Cited

U.S. PATENT DOCUMENTS

| | | | | |
|---|---|---|---|---|
| 2004/0208207 | A1* | 10/2004 | Kasper | H04B 10/503 |
| | | | | 372/26 |
| 2006/0133436 | A1* | 6/2006 | Nishiyama | H04B 10/807 |
| | | | | 372/38.04 |
| 2007/0292138 | A1* | 12/2007 | Echols | H04B 10/801 |
| | | | | 398/116 |
| 2011/0164884 | A1* | 7/2011 | Yamada | H04B 10/116 |
| | | | | 398/172 |
| 2013/0200930 | A1* | 8/2013 | Daghighian | H03K 7/08 |
| | | | | 327/124 |

FOREIGN PATENT DOCUMENTS

| | | | |
|---|---|---|---|
| CN | 104243034 A | | 12/2014 |
| CN | 105812055 A | | 7/2016 |
| CN | 105915284 A | * | 8/2016 |
| CN | 105915284 A | | 8/2016 |
| CN | 105959061 A | | 9/2016 |
| CN | 106249850 A | | 12/2016 |

\* cited by examiner

VISIBLE LIGHT COMMUNICATION TRANSCEIVER AND VISIBLE LIGHT COMMUNICATION SYSTEM

TECHNICAL FIELD

This application is a national stage filing under 35 U.S.C. § 371 of International Patent Application Serial No. PCT/CN2017/087415, filed Jun. 7, 2017, which claims priority to Chinese Patent Application No. 201710399665.8, titled "VISIBLE LIGHT COMMUNICATION TRANSCEIVER AND VISIBLE LIGHT COMMUNICATION SYSTEM", filed on May 31, 2017 with the China National Intellectual Property Administration. The contents of these applications are incorporated herein by reference in their entirety.

BACKGROUND

With the development of internet technology, the demand for wireless communication rate and capacity has risen sharply, and the frequency spectrum resources used in conventional wireless communication have become increasingly difficult to meet the demand. Since the light spectrum band used in wireless optical communication is a license free spectrum band, the wireless optical communication system based on a visible light band is more and more concerned.

Photodetectors can convert optical signals into electrical signals and are an important part of visible light communication. The existing photodetectors mainly include photodiodes (PDs), avalanche photodiodes (APDs), light emitting diodes (LEDs), and photomultiplier tubes (PMTs). Among the above photodetectors, three light detectors of PD, APD and PMT all receive a visible light in a wide light spectrum. If an optical signal having a specific wavelength is to be received and optical signals having other specific wavelengths are to be filtered out, an optical filter corresponding to a specific wavelength range is required to realize the function of receiving the optical signal having the specific wavelength. However, as a light detector, since an LED can independently receive an optical signal and has better wavelength selectivity, and most LEDs have the advantage of narrow light spectrum response, the optical filter corresponding to a specific wavelength range is not required when the LED receives the optical signal having the specific wavelength.

Since the LED can independently receive an optical signal, a visible light communication transceiver, in which an LED is used as a receiving terminal, can realize two-way receiving and transmitting an optical signal. However, during the research process, it was found that the existing visible light communication transceiver, in which the LED is used as the receiving terminal, performs the two-way receiving and transmitting of an optical signal in a time division multiplexing mode. Therefore, a visible light communication transceiver capable of simultaneously receiving and transmitting an optical signal is necessary.

SUMMARY

Therefore, a visible light communication transceiver is provided according to the present disclosure to realize receiving and transmitting optical signals simultaneously.

A visible light communication system based on the visible light communication transceiver is further provided according to the present disclosure to implement a communication system receiving and transmitting optical signals simultaneously.

A multicolor visible light communication system is further provided according to the present disclosure. Based on multiple color LEDs responding to different narrow light spectrum bands, a low-cost and low-complexity visible light communication system is realized by adopting multiple pairs of LED-LED links for optical communication.

Therefore, technical solutions provided according to the present disclosure are as follows.

A visible light communication transceiver is provided according to the disclosure. The visible light communication transceiver includes an LED light source, a Bias Tee-like circuit, a drive amplification module, and an adaptive amplification and equalization module.

The LED light source is connected to a radio frequency and direct current hybrid port of the Bias Tee-like circuit, the drive amplification module is connected in parallel with the adaptive amplification and equalization module, and the drive amplification module and the adaptive amplification and equalization module connected in parallel are connected to a radio frequency port of the Bias Tee-like circuit.

The drive amplification module is configured to: perform digital-to-analog conversion and amplification on a digital modulation signal to obtain a first electrical signal; and transmit the first electrical signal to the Bias Tee-like circuit via the radio frequency port.

The Bias Tee-like circuit is configured to transmit the first electrical signal to the LED light source via the radio frequency and direct current hybrid port.

The LED light source is configured to: perform electrical-to-optical conversion on the first electrical signal to generate a first optical signal and transmit the first optical signal; and perform optical-to-electrical conversion on a received second optical signal to obtain a second electrical signal. The second optical signal includes an optical signal transmitted by a peer terminal, or an optical signal generated by external material excited by the optical signal transmitted by the LED light source, or an optical signal returned after being reflected. A capability of the LED light source for responding to the second optical signal is negatively correlated with an optical power of the first optical signal.

The Bias Tee-like circuit is configured to obtain the second electrical signal from the LED light source, and transmit the second electrical signal to the adaptive amplification and equalization module via the radio frequency port.

The adaptive equalization module is configured to adjust a gain of the second electrical signal based on the optical power of the first optical signal, to obtain an electrical signal corresponding to the second optical signal.

The adaptive amplification and equalization module includes an adaptive gain control circuit and an equalization circuit.

If a forward bias voltage of the LED light source is greater than a conversion voltage of the LED light source, a gain coefficient of the adaptive gain control circuit is set to be $e^{[\alpha(V-V_0)]}$, where V represents the forward bias voltage, and $V_0$ represents a constant.

If the forward bias voltage of the LED light source is less than the conversion voltage of the LED light source, the gain coefficient of the adaptive gain control circuit is set to be $e^{[\beta V]}$.

The equalization circuit is configured to increase a bandwidth of the second electrical signal.

The LED light source includes any one of a monochromatic LED light source, a micron-level LED light source, an organic LED light source and a quantum dot LED light source, or the LED light source includes any one of an array of monochromatic LED light sources, an array of micron-level LED light sources, an array of organic LED light sources and an array of quantum dot LED light sources.

Two physical processes of the electrical-to-optical conversion and the optical-to-electrical conversion are implemented on the same microstructure of same material.

The LED light source is capable of receiving an external optical signal when the LED light source performs normal lighting or displaying.

A visible light communication system is further provided according to the disclosure. The visible light communication system includes two visible light communication transceivers. Each of the two visible light communication transceivers is the visible light communication transceiver described above. The two visible light communication transceivers communicate with each other by optical signals.

Colors of the LED light sources of the two visible light communication transceivers include red and red-orange.

A multicolor visible light communication system is further provided according to the disclosure. The multicolor visible light communication system includes at least two pairs of LED-LED links.

Each pair of the LED-LED links includes a transmitter and a receiver. LEDs in each pair of the LED-LED links are configured with a preset color pair. LED light sources in different LED-LED links are configured with different color pairs.

The transmitter is configured to generate and transmit an optical signal.

The transmitter includes a first processing module and a first LED light source connected to the first processing module. The first processing module is configured to generate a digital or analog modulation signal and transmit the digital or analog modulation signal to the first LED light source. The first LED light source is configured to perform electrical-to-optical conversion on the digital or analog modulation signal to obtain an optical signal and transmit the optical signal.

The receiver is configured to receive the optical signal and obtain required information from the optical signal.

The receiver includes a second processing module and a second LED light source connected to the second processing module. The second LED light source is configured to receive the optical signal and perform optical-to-electrical conversion on the optical signal to obtain the digital or analog modulation signal. The second processing module is configured to obtain required information from the digital or analog modulation signal.

A quasi-diagonal channel matrix is formed in the LED-LED links, and a communication mode of the multicolor visible light communication system is a full-duplex communication mode.

The multicolor visible light communication system includes two visible light communication systems, each of the two visible light communication systems includes two pairs of LED-LED links.

In one pair of the two pairs of LED-LED links, the LED light source of the transmitter is configured as a red LED light source, and the LED light source of the receiver is configured as a red LED light source. In the other pair of the two pairs of LED-LED links, the LED light source of the transmitter is configured as a blue LED light source, and the LED light source of the receiver is configured as a green LED light source.

A communication mode of each of the two visible light communication systems is an asymmetric full-duplex communication mode. The blue LED light source is configured to operate in a downlink communication mode, and the red LED light source is configured to operate in a time-division multiplex uplink and downlink mode. When the red LED light source operates in an uplink mode, a signal-to-noise ratio estimated by the second processing module is fed back to the first processing module and a communication mode of transmitting by using antenna is selected.

The first processing module includes a low-order modulation sub-module and a high-order modulation sub-module. The low-order modulation sub-module is configured to modulate a baseband signal based on a low-order modulation order to obtain the digital or analog modulation signal if an average optical power of the LED-LED link is a low average optical power. The high-order modulation sub-module is configured to modulate the baseband signal based on a high-order modulation order to obtain the digital or analog modulation signal if the average optical power of the LED-LED link is a high average optical power.

Compared with the conventional technology, the technical solution according to the present disclosure has the following advantages.

The simultaneous receiving and transmitting of optical signals by the LED light source indicates that the LED light source can receive an external optical signal when the LED light source performs normal lighting or displaying. Since two physical processes of the electrical-to-optical conversion and the optical-to-electrical conversion are implemented on the same microstructure of same material, for the application that location-based information push is performed by using visible light communication technology, the location accuracy can be improved.

In practice, an optical power of the first optical signal transmitted by the LED light source and an optical power of the second optical signal received by the LED light source are superimposed in a small proportion, thus the LED may not accurately receive the second optical signal. In order to reduce the effect caused by the superposition of a part of the optical powers of the first optical signal and the second optical signal, in the visible light communication transceiver according to an embodiment of the present disclosure, a drive amplification module and an adaptive amplification and equalization module are connected in parallel at a signal input terminal. The drive amplification module is configured to perform digital-to-analog conversion and amplification on a digital modulation signal to obtain a first electrical signal, and transmit the first electrical signal to the LED light source via the Bias Tee-like circuit. Then, the LED light source controls the optical power of the generated first optical signal based on the first electrical signal. The LED light source is configured to perform optical-to-electrical conversion on a received second optical signal to obtain a second electrical signal. Since the capability of the LED light source for performing optical-to-electrical conversion on the received second optical signal to obtain the second electrical signal is negatively correlated with the optical power of the transmitted first optical signal, the control of the optical power of the first optical signal affects the capability of the LED light source for responding to the second optical signal. The adaptive amplification and equalization module in the visible light communication transceiver according to an embodiment of the present disclosure is configured to adjust a gain of the second electrical signal based on the optical power of the first optical signal, thus the visible light communication transceiver obtains an electrical signal corresponding to the second optical signal, thereby realizing that the visible light communication transceiver receives and transmits optical signals simultaneously.

Apparently, any product for implementing the present disclosure is unnecessarily to simultaneously achieve all of the advantages described above.

BRIEF DESCRIPTION OF THE DRAWINGS

The drawings to be used in the description of the embodiments or the conventional technology are described briefly as follows, so that the technical solutions according to the embodiments of the present disclosure or according to the conventional technology become clearer. It is apparent that the drawings in the following description only illustrate some embodiments of the present disclosure. For those skilled in the art, other drawings may be obtained according to these drawings without any creative work.

DETAILED DESCRIPTION OF THE EMBODIMENTS

Technical solutions according to embodiments of the present disclosure are described clearly and completely hereinafter in conjunction with drawings used in the embodiments of the present disclosure. Apparently, the described embodiments are only some embodiments of the present disclosure rather than all the embodiments. Any other embodiments obtained by those skilled in the art based on the embodiments of the present disclosure without any creative work fall in the scope of protection of the present disclosure.

Figure 1:
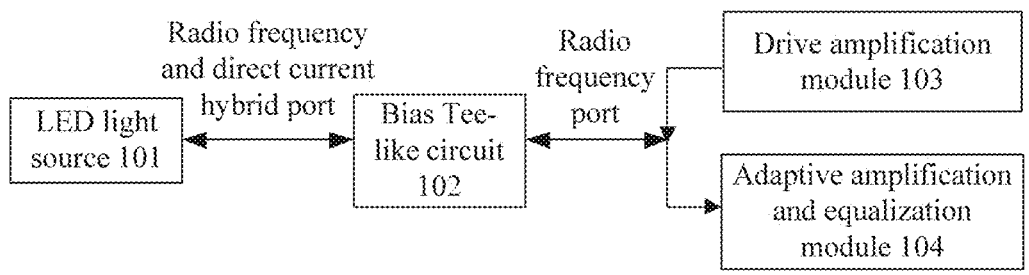
FIG. 1 is a schematic diagram of a visible light communication transceiver according to the present disclosure.

FIG. 1 is a schematic diagram of a visible light communication transceiver according to an embodiment of the present disclosure. The visible light communication transceiver includes an LED light source 101, a Bias Tee-like circuit 102, a drive amplification module 103, and an adaptive amplification and equalization module 104.

Structure connection relationships of the visible light communication transceiver are as follows. The Bias Tee-like circuit 102 has three ports, which includes a direct current bias port, a radio frequency port, and a radio frequency and direct current hybrid port. The LED light source 101 is connected to the radio frequency and direct current hybrid port of the Bias Tee-like circuit 102. The driving amplifier module 103 is connected in parallel with the adaptive amplification and equalization module 104, and then the drive amplification module 103 and the adaptive amplification and equalization module 104 connected in parallel are connected to the radio frequency port of the Bias Tee-like circuit 102.

Based on the structure of the visible light communication transceiver shown in FIG. 1, the working principle of receiving and transmitting optical signals simultaneously is as follows.

It is found that a quantum well structure in the LED light source may be able to implement electrical-to-optical conversion and optical-to-electrical conversion simultaneously. Therefore, based on the characteristics of the quantum well structure in the LED light source that the quantum well structure is able to implement electrical-to-optical conversion and optical-to-electrical conversion simultaneously, the LED light source can receive an optical signal while transmitting an optical signal. In the embodiment, the optical signal transmitted by the LED light source is referred to as a first optical signal, and an optical signal received by the LED light source is referred to as a second optical signal. In practice, an optical power of the first optical signal transmitted by the LED light source and an optical power of the second optical signal received by the LED light source are superimposed in a small proportion, thus the LED may not accurately receive the second optical signal. In order to reduce the effect caused by the superposition of a part of the optical powers of the first optical signal and the second optical signal, as shown in FIG. 1, a drive amplification module 103 and an adaptive amplification and equalization module 104 connected in parallel at a signal input terminal of the visible light communication transceiver are provided according to the embodiment. The drive amplification module 103 is configured to perform digital-to-analog conversion and amplification on a digital modulation signal. In the embodiment, an modulation signal, obtained by performing the digital-to-analog conversion and amplification on the digital modulation signal, is referred to as a first electrical signal. The first electrical signal is transmitted to the LED light source 101 via the Bias Tee-like circuit 102. The LED light source 101 controls the optical power of the generated first optical signal based on the first electrical signal. The LED light source 101 is configured to perform optical-to-electrical conversion on a received second optical signal to obtain a second electrical signal. Since the capability of the LED light source 101 for responding to the second optical signal is negatively correlated with the optical power of the transmitted first optical signal, in the embodiment, after the second electrical signal is obtained by the LED light source 101 in the visible light communication transceiver shown in FIG. 1, the second electrical signal is outputted to the adaptive amplification and equalization module 104 via the radio frequency port of the Bias Tee-like circuit 102. The adaptive amplification and equalization module 104 adjusts a gain of the second electrical signal based on the optical power of the first optical signal to obtain an electrical signal corresponding to the second optical signal. Thus, the LED light source can accurately receive the second optical signal.

In practice, the drive amplification module may be implemented by a current feedback operational amplifier circuit with an external negative feedback resistor, where a resistance of the negative feedback resistor is smaller, a bandwidth is greater, the circuit is more unstable, and the signal-to-noise ratio is smaller. Apparently, the drive amplification module may also be implemented by other circuit structures. The specific implementation of the drive amplification module is not limited in the embodiment.

In the embodiment, the adaptive amplification and equalization module 104 may include an adaptive gain control circuit and an equalization circuit. The relationship between a gain coefficient of the adaptive gain control circuit and a forward bias voltage of the LED light source is as follows. If the forward bias voltage V of the LED light source is greater than a conversion voltage $V_b$ of the LED light source, $\eta = e^{[\alpha(V-V_0)]}$, where $\alpha$ and $V_0$ represent constants. If the forward bias voltage V of the LED light source is less than a conversion voltage $V_b$ of the LED light source, the gain coefficient $\eta = e^{[\beta V]}$, where $\beta$ represents a constant.

The equalization circuit in the adaptive amplification and equalization module 104 may include a low-pass filter circuit for increasing the bandwidth of the second electrical signal.

Specifically, the adaptive amplification and equalization module 104 may be implemented in various ways, for example, adopting a transistor tube as a power amplifier device, or adopting a combination of a buf tube and an operational amplifier to amplify a signal and pre-equalize a frequency band. Apparently, the specific implementation of the adaptive amplification and equalization module 104 according to the embodiment is only a reference implementation, and in practice, other implementations may be adopted. The specific implementation of the adaptive amplification and equalization module 104 is not limited in the embodiment.

In order to reduce interference between the first optical signal and the second optical signal as much as possible, a frequency band for transmitting the first optical signal may be different from a frequency band for receiving the second optical signal. If a same frequency band is used to transmit the first optical signal and to receive the second optical signal, since the first optical signal to be transmitted is known, a corresponding interference cancellation algorithm may be used for the received second optical signal, and then the second optical signal may be obtained by using a suitable estimation algorithm. A variety of clutter signals appear in a circuit adopting an operational amplifier, which is caused by oscillation of the operational amplifier. Therefore, feedback of the circuit is required to be adjusted to eliminate effect of a parasitic capacitance.

The LED light source 101 in the visible light communication transceiver shown in FIG. 1 may be configured as any one of a monochromatic LED light source, a micron-level LED light source, an organic LED light source and a quantum dot LED light source, or the LED light source 101 may be configured as any one of an array of monochromatic LED light sources, an array of micron-level LED light sources, an array of organic LED light sources and an array of quantum dot LED light sources.

The monochromatic LED light source may include a white LED light source, a red LED light source, a blue LED light source, a green LED light source, and an orange LED light source or the like. The white LED light source includes a blue chip along with yellow phosphor, and the blue chip may be loaded with a modulation signal. A red chip in the red LED light source may be loaded with the modulation signal. A blue chip in the blue LED light source may be loaded with the modulation signal. The green LED light source and the orange LED light source have independent optical signal transceiver circuits.

In the embodiment, the visible light communication transceiver includes a modulation module and a demodulation module. The modulation module is connected to the drive amplification module 103, and is configured to generate a digital modulation signal and transmit the digital modulation signal to the drive amplification module. The demodulation module is connected to the adaptive amplification module 104 and is configured to demodulate the first electrical signal.

Based on a circuit design principle of the visible light communication transceiver according to the embodiment, it can be seen that the visible light communication transceiver may simultaneously receive and transmit optical signals. Therefore, according to the circuit design of the visible light communication transceiver according to the embodiment, a class of light emitting devices such as LED light sources may be used to implement a visible light communication transceiver having the capability of simultaneously receiving and transmitting optical signals, reducing manufacturing cost of a communication system formed by the visible light communication transceiver.

Based on the visible light communication transceiver according to a first embodiment, a visible light communication system is provided according to an embodiment. A schematic structural diagram of the visible light communication system is shown in FIG. 2.

Figure 2:
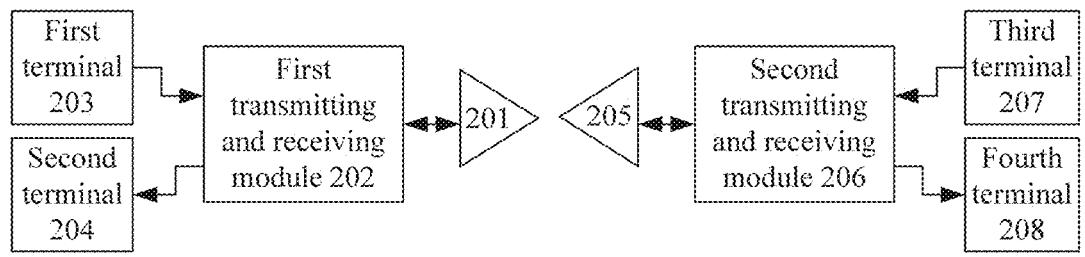
FIG. 2 is a block diagram of a visible light communication system according to the present disclosure.

The visible light communication system shown in FIG. 2 includes two visible light communication transceivers, and the two visible light communication transceivers are distributed at a left side and a right side respectively. An LED light source 201 at the left side may be configured as a red LED light source or a red-orange LED light source, and the LED light source transmits and receives optical signals. The LED light source 201 is connected to a first transmitting and receiving module 202, which has a same circuit structure as the visible light communication transceiver according to the first embodiment. The transmitting and receiving module 202 is configured to receive a modulation signal generated by a first terminal 203, and transmit the received modulation signal to a second terminal 204.

An LED light source 205 at the right side may be configured as a red LED light source or a red-orange LED light source, and the LED light source transmits and receives optical signals. The LED light source 205 is connected to a second transmitting and receiving module 206, which has the same circuit structure as the visible light communication transceiver according to the embodiment. The transmitting and receiving module 206 is configured to receive a modulation signal generated by a third terminal 207, and transmit the received modulation signal to a fourth terminal 208.

The first terminal 203 and the third terminal 207 both implement functions of data generation, serial-to-parallel conversion, and modulation. In practice, all the functions may be performed by a terminal with an FPGA chip. The second terminal 204 and the fourth terminal 208 implement functions of analog-to-digital conversion, synchronization, demodulation decision, and parallel-to-serial conversion. In practice, all the functions may be performed by a terminal with an FPGA chip.

Figure 3:
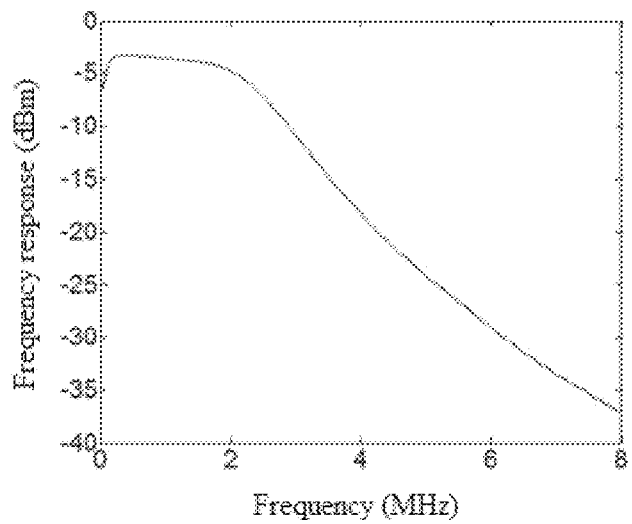
FIG. 3 shows a frequency response curve of a red LED-red LED link according to the present disclosure.
Figure 4A:
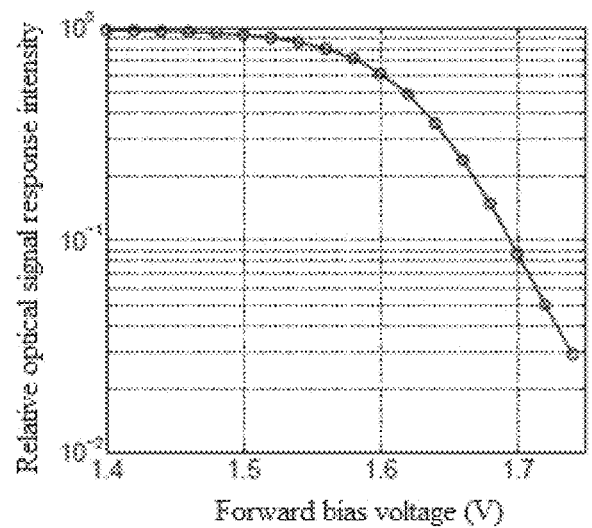
FIG. 4(a) is a schematic diagram showing a relationship between a relative optical signal response intensity and a forward bias voltage of a red LED light source according to the present disclosure.
Figure 4B:
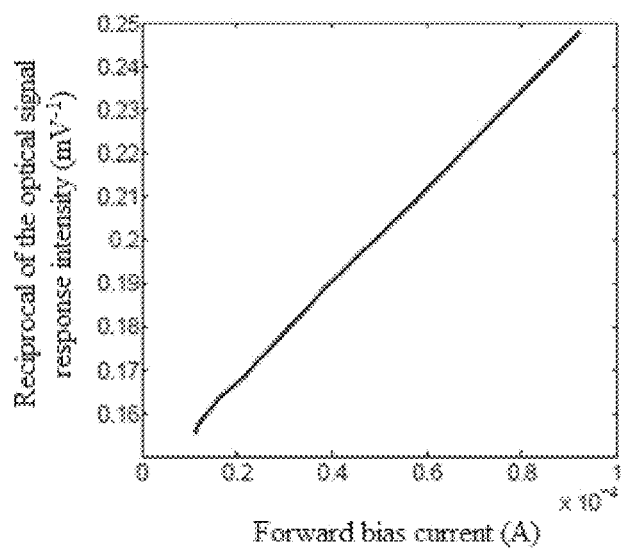
FIG. 4(b) is a schematic diagram showing a relationship between a relative optical signal response intensity and a forward bias current of a red LED light source according to the present disclosure.

In the visible light communication system shown in FIG. 2, an LED-LED link including the LED light source 201 and the LED light source 205 implements duplex communication. The LED light source 201 and the LED light source 205 may form a red LED-red LED link. A frequency response curve of the red LED-red LED link is shown in FIG. 3, where an abscissa represents frequency and an ordinate represents frequency response. Response made by a red chip in the red LED light source to a received optical signal while transmitting an optical signal is shown in FIG. 4. FIG. 4(a) shows a relationship between a relative optical signal response intensity and a forward bias voltage of a red LED light source, where an abscissa represents the forward bias voltage and an ordinate represents the relative optical signal response intensity. FIG. 4(b) shows a relationship between the relative optical signal response intensity and a forward bias current of the red LED light source, where an abscissa represents the forward bias current and an ordinate represents a reciprocal of an optical signal response intensity.

In the visible light communication system in which the LED light source is used as a light detector, high and low levels at which the LED light source works have a greater impact on an achievable rate of the visible light communication system. Specific impact is described below by taking an OOK full-duplex system, based on the red LED-red LED link, as an example.

Assuming that the LED light source works in a linear region, $V_H$ represents a high level, and $V_L$ represents a low level, responsibility of the LED light source at the high level may be expressed by equation (1), and the responsibility of the LED light source at the low level may be expressed by equation (2):

$$\eta_H = e^{-\alpha V_H + \beta} \quad (1)$$

$$\eta_L = e^{-\alpha V_H + \beta} \quad (2)$$

Assuming that a signal from the LED light source is received by another LED light source via a channel, A represents a gain coefficient, and $\sigma^2$ represents a noise variance, the signal-to-noise ratio at the high level may be expressed by equation (3), and the signal-to-noise ratio at the low level may be expressed by equation (4):

$$SNR_H = \eta_H A \frac{V_H - V_L}{\sigma} = A \frac{V_H - V_L}{\sigma} e^{-\alpha V_H + \beta} \quad (3)$$

$$SNR_L = \eta_L A \frac{V_H - V_L}{\sigma} = A \frac{V_H - V_L}{\sigma} e^{-\alpha V_L + \beta} \quad (4)$$

It can be seen from the equations (3) and (4) that $SNR_H$ and $SNR_L$ are negatively correlated with $V_L$. The smaller $V_L$ is, the greater the signal-to-noise ratio is, so $V_L$ is set as a lower bound of a voltage linear region. If the LED light source transmits zero and one with equal probability, the achievable rate of the OOK system may be expressed by equation (5):

$$C(V_H) = C_{OOK}(SNR_H(V_H)) + C_{OOK}(SNR_L(V_H)) \quad (5)$$

Figure 5:
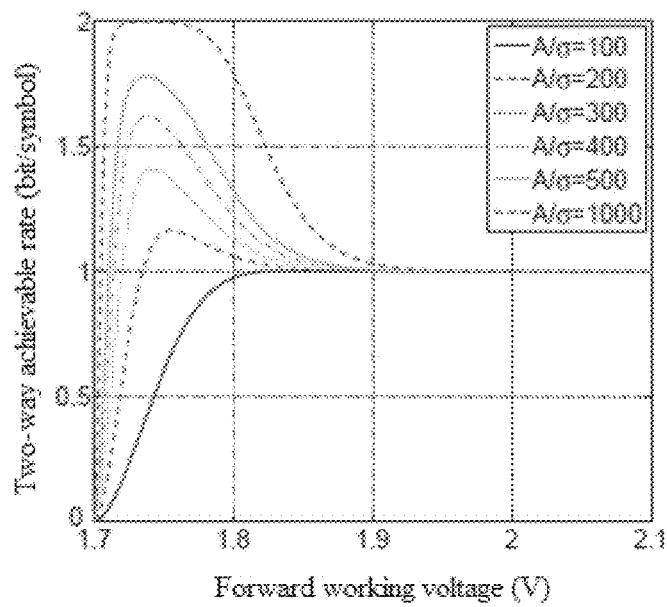
FIG. 5 is a schematic diagram showing a relationship between a two-way achievable rate and a forward working voltage of a red LED-red LED full-duplex link at different signal-to-noise ratios according to the present disclosure.

In the OOK system, channel capacity is calculated based on binary symmetric channel capacity. Simulation of a change of the achievable rate with $V_H$ is performed at different signal-to-noise ratios. During the simulation, $V_L=1.7V$, $V_H \in (1.7,2.2]$, $\alpha=26.5$, and $\beta=44.4$. A relationship between a two-way achievable rate and a forward working voltage of a red LED-red LED full-duplex link at different signal-to-noise ratios is shown in FIG. 5, where an abscissa represents the forward working voltage and an ordinate represents the two-way achievable rate. It can be seen from FIG. 5 that, at a low signal-to-noise ratio, performance is not ideal due to suppression effect of the forward voltage on response, and at a high signal-to-noise ratio, the achievable rate is great, and the achievable rate can be maximized by selecting a suitable high level.

Since the LED light source has different responses at high and low levels if the LED light source is used as a receiver, it is hoped to increase probability of occurrence of the low level by changing the proportion of the high level and the low level, so as to increase the achievable rate of the entire OOK communication system. This goal can be achieved by coding to make proportion of zero and one uneven. After the proportion of zero and one in a signal sent by a transmitter is changed, capacity of a binary symmetrical channel is to be reduced accordingly. By comparing the achievable rates at different signal-to-noise ratios, it can be seen that at a low signal-to-noise ratio, the maximum achievable rate can be increased to a certain extent by changing the proportion of symbol 1, and at a high signal-to-noise ratio or if the proportion of symbol 1 is small, the performance is deteriorated. It can be seen from FIG. 5 that the achievable rate can be maximized by selecting a suitable high level, and the optimal high level decreases with the increase of the signal-to-noise ratio.

It should be noted that the visible light communication system shown in FIG. 2 includes only two visible light communication transceivers simultaneously receiving and transmitting optical signals. In practice, other circuits may be built based on the visible light communication system shown in FIG. 2 as long as optical signals can be simultaneously received and transmitted. The specific structure of the visible light communication system which can simultaneously receive and transmit optical signals is not limited in the embodiment.

According to the embodiment, a full-duplex LED-LED link is realized to transmit and receive optical signals simultaneously, and the high and low levels at which the LED light source operates, to achieve the maximum achievable rate of the visible light communication system, are determined Especially, a high level corresponding to the maximum achievable rate is determined. In addition, compared with the conventional visible light communication system combining an LED-PD and an optical filter, in the visible light communication system including the LED-LED link according to the embodiment, the optical filter is not needed, reducing the complexity and cost of the visible light communication system.

Figure 6:
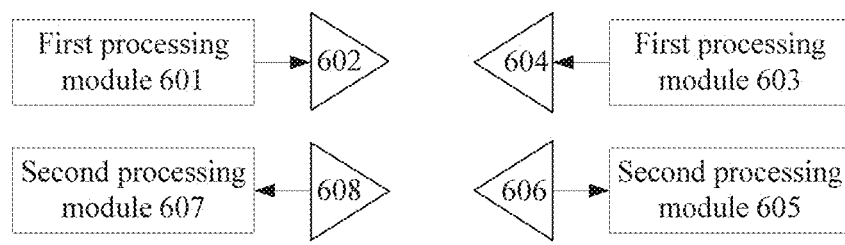
FIG. 6 is a block diagram of a multicolor visible light communication system according to the present disclosure.

Reference is made to FIG. 6, which is schematic structural diagram of a multicolor visible light communication system according to the present disclosure. The multicolor visible light communication system includes a first processing module 601, a first LED light source 602, a first processing module 603, a first LED light source 604, a second processing module 605, a second LED light source 606, a second processing module 607, and a second LED light source 608.

The first processing module 601 is configured to generate a digital or analog modulation signal and transmit the digital or analog modulation signal to the first LED light source 602.

The first LED light source 602 is configured to perform optical-to-electrical conversion on the digital or analog modulation signal to obtain an optical signal and transmit the optical signal.

The second LED light source 606 is configured to receive the optical signal transmitted by the first LED light source 602, perform optical-to-electrical conversion on the received optical signal to obtain an electric signal, and transmit the electric signal to the second processing module 605.

The second processing module 605 is configured to obtain required information from the electric signal.

The first processing module 603 is configured to generate a digital or analog modulation signal and transmit the digital or analog modulation signal to the first LED light source 604.

Function of the first LED light source 604 is the same as the function of the first LED light source 602.

The second LED light source 608 is configured to receive an optical signal transmitted by the first LED light source 604, perform optical-to-electrical conversion on the received optical signal to obtain an electric signal, and transmit the electric signal to the second processing module 607.

The second processing module 607 is configured to obtain required information from the electric signal.

Among the above modules, all the first processing modules may be formed by a simple on-off keying modulation (OOK) or an orthogonal frequency division multiplexing modulation (OFDM) connected with a Bias Tee-like circuit. All the second processing modules may be formed by a signal processing board connected with a client terminal. The implementations of the first processing module and the second processing module according to the embodiment are only one kind of implementations. In practice, the first processing module and the second processing module may be implemented in other ways, as long as functions of the first processing module and the second processing module are implemented.

The LED light source has a light spectrum selective reception characteristic. Therefore, any LED light source with a determined color only has a good response to an optical signal transmitted by an LED light source with a specific color. In order to determine color pairs with which LED light sources can respond, a communication system including two 3×N RGB LED light emitting diode arrays is taken as an example to determine, among red, green, and blue, with which colors the LED light sources are paired to achieve a good light spectrum response.

In each of the 3×N RGB LED light emitting diode array, there are N light emitting diodes for each color. Light emitting diodes with a same color are connected in series in the module, and LEDs with different colors have independent electrical signals. In addition to a light spectrum bandpass response characteristic without additional optional filters, multicolor LED arrays have a unique phenomenon different from Si detector arrays. Distortion of RGB LED array signal caused by partial blocking of an optical link depends on the number and color of the LEDs. If a 3×3 RGB LED module is used as a photodetector, the 3×3 RGB LED module may be considered as a photodetector array. However, if compared with Si-PD arrays, due to being a wide band gap semiconductor, the LED arrays have some unique light response phenomena. If the above 3×3 RGB LED module is used as a photodetector to receive an optical signal with a wavelength corresponding to a sine wave with an offset, the 3×3 RGB LED module has the following three characteristics.

1. If one or two red LEDs functioning as photodetectors are blocked, both direct current response and alternating current responses disappear.

2. If one green LED functioning as a photodetector is blocked, the direct current response drops to zero, and the alternating current response is robust; if any two green LEDs are blocked, the alternating current response disappears.

3. If one blue LED functioning as a photodetector is blocked, the direct current response is halved and the alternating current response is robust; if any two blue LEDs are blocked, the direct current response disappears and the alternating current response is halved.

Reasons for the above three characteristics mainly include two aspects. One is whether the LED is packaged with the TVS, and the other is the matching between a band gap of the LED and a threshold voltage of the TVS. Therefore, the RGB LED array may be used for multi-color interference management in the visible light communication system, or used as a multi-mode detector.

Firstly, red, green, and blue LEDs are used as light sources and light receivers. In the 3×3 RGB LED array formed by 9 LEDs, lamp spacing is 30 mm, and every three LEDs with the same color are connected in series. Each of the LEDs has a lens with a full beam angle of 12°. With the lens, a significant channel gain is achieved for the LED-LED link. In green and blue LEDs, a transient voltage suppressor (TVS) is connected in parallel with an InGaN chip, and flip-chip packaging is employed. In the red LEDs, an AlInGaP chip packaged on a ceramic board is adopted.

There are nine possible color pairs for two LED modules since each LED module includes red, green, or blue light emitting diodes. Signals outputted by the LED at the receiving end are recorded by an oscilloscope. Following nine groups of experiments are performed: R-R, R-G, R-B, G-R, G-G, G-B, B-R, B-G, and B-B. Previously, AlInGaP or InGaN-based photodiodes or solar cells have attracted much attention. Photoluminescence (PL) due to absorbing light and electroluminescence (EL) due to current injection of AlInGaP and InGaN/GaN LEDs have also been studied. Marcin Kowalczyk proposed that an LED can detect light having a wavelength less than an emission wavelength of the LED, where the difference between the wavelength of the light and the emission wavelength of the LED is less than 100 nm. The structure of an LED is similar to a structure of a photodiode (PD), formed by a PN junction. Two effects constrain response wavelength. The band gap determines the emission wavelength of the LED and an upper cutoff wavelength when the LED is used as a receiver. Any photon having a wavelength greater than the upper cutoff wavelength has no enough energy to excite electron-hole pair. If short-wavelength light is incident on the LED, absorption of photons is mainly affected by material. If the wavelength is shorter, a photon is more easily absorbed by surface of the PN junction, contributing less to a photocurrent. Due to the two effects, LEDs become light detectors having a narrower response light spectrum than most commercial photodiodes.

Based on the above experiments, it is determined that the red LED responds to red light and green light, and does not respond to blue light. It is speculated that the red LED is insensitive to the blue light due to packaging structure. A cathode of the red LED is at an upper part of the packaging structure, and most of the incident blue light is absorbed by an n-GaP, thus electron-hole pairs at light emitting layer cannot be effectively excited. Compared to the response of the red LED to a red LED, response of the red LED to green light emitted by a green LED is much smaller, having a difference in orders of magnitude. In a case of using a green LED as a receiver, the green LED does not respond to red light. In addition, unlike the red LED, the green light emitting diode does not respond to green light, and responds strongly to blue light emitted by a blue LED.

The blue LED may be considered as a good visible light narrow-spectrum blue light receiving device since the blue LED only responds to blue light. However, response intensity of the blue LED to the blue light is not as good as the response intensity of the green LED to the blue light.

Then, a white light source is used and an optical filter is placed in front of a receiving LED to select a wavelength range received by the LED. The optical filter is selected as follows (center wavelength/full width at half maximum, unit: nm): 525/50, 582/75, and 630/38 for a red LED; 435/40, 475/50, and 525/50 for a green LED; and 435/40, 475/50 for a blue LED. A white LED is driven by a constant voltage, and response of the receiving LED is obtained by measuring voltage with the oscilloscope. Normalization is performed by dividing the response of each LED with an optical filter by an optical power of a light passing through the optical filter. Further, another normalization is performed by comparing the response of each LED with an optical filter and the response of each LED without the optical filter (measurement of the response of the LED to the entire white light spectrum) to obtain a relative response rate. Therefore, the relative response rate of the LED without an optical filter is defined as 1. If the relative response rate of the LED is greater than 1, contribution in a corresponding wavelength range is greater than an average contribution in the entire light spectrum. A greater relative response rate indicates a higher sensitivity of the LED in a corresponding light spectrum range.

Response spectrum ranges of RGB LEDs are obtained as shown in Table 1, Table 2, and Table 3. Table 1 is the response spectrum range of the red LED light source. Table 2 is the response spectrum range of the green LED light source. Table 3 is the response spectrum range of the blue LED light source.

TABLE 1

| Filter | None | 525/50 | 582/75 | 630/38 |
|---|---|---|---|---|
| Response voltage (V) | 4.56 | 0.50 | 3.61 | 1.24 |
| Relative response rate | 1 | 0.46 | 2.19 | 2.64 |

TABLE 2

| Filter | None | 435/40 | 475/50 | 525/50 |
|---|---|---|---|---|
| Response voltage (V) | 3.03 | 2.2 | 0.56 | 0.1 |
| Relative response rate | 1 | 3.01 | 2.99 | 0.13 |

TABLE 3

| Filter | None | 435/40 | 475/50 |
|---|---|---|---|
| Response voltage (V) | 4.7 | 3.3 | 0.61 |
| Relative response rate | 1 | 2.89 | 2.16 |

According to the response results of the RGB LEDs listed in Table 1, Table 2, and Table 3, it can be seen that the red LED with optical filters of 582/75 nm and 630/38 nm have stronger responses, and the blue LED and the green LED with optical filters of 435/40 nm and 475/50 nm have strong responses. Compared with the green LED, the blue LED usually has a shorter photoelectric response wavelength. It may not be optimal to use the same color LED as the transmitter and the receiver, since a light spectrum used by the LED for photoelectric emission and a light spectrum used by the LED for photoelectric response usually do not match. However, the red LED is an exception because a degree of mismatch between the light spectrum for photoelectric emission and the light spectrum for photoelectric response is small. In addition, a suitable color pair can be found for the transmitter and the receiver, such as transmitting with a blue light emitting diode and detecting with a green light emitting diode.

Based on the above experiments, two links with little interference between each other are found: R-R and B-G In addition, response light spectrum ranges of eight colors shown in Table 4 are obtained based on experiments, including: royal blue, blue, cyan, green, amber, red-orange, red, and deep red.

Then, by using the eight LED light sources emitting light of different colors as the receiver and the transmitter respectively, response voltages between the eight receivers and the eight transmitters as shown in Table 5 are obtained.

TABLE 4

| Color of light emitting diode (LED) | Response light spectrum ranges |
|---|---|
| Royal Blue | 435/40 |
| Blue | 435/40 |
| Cyan | 435/40, 475/50 |
| Green | 435/40, 475/50 |
| Amber | 582/75 |
| Red-orange | 582/72, 630/38 |
| Red | 630/38, 582/75 |
| Deep Red | 630/38, 582/75, 678/67 |

TABLE 5

| Voltage Transmitter | Receiver | | | | | | | |
|---|---|---|---|---|---|---|---|---|
| | Royal Blue | Blue | Cyan | Green | Amber | Red-orange | Red | Deep Red |
| Royal Blue | 0.732 | 0.775 | 1.41 | 1.26 | 0.016 | 0.050 | 0.023 | 0.046 |
| Blue | 0.022 | 0.075 | 0.479 | 0.694 | 0.017 | 0.050 | 0.023 | 0.058 |
| Cyan | 0.016 | 0.023 | 0.148 | 0.349 | 0.079 | 0.108 | 0.057 | 0.323 |
| Green | 0.015 | 0.015 | 0.017 | 0.024 | 0.072 | 0.133 | 0.080 | 0.301 |
| Amber | 0.015 | 0.015 | 0.015 | 0.015 | 0.087 | 0.170 | 0.109 | 0.349 |
| Red-orange | 0.015 | 0.015 | 0.015 | 0.015 | 0.040 | 1.16 | 1.27 | 1.29 |
| Red | 0.015 | 0.015 | 0.015 | 0.015 | 0.027 | 0.261 | 0.754 | 1.25 |
| Deep Red | 0.015 | 0.015 | 0.015 | 0.015 | 0.017 | 0.117 | 0.225 | 1.27 |
| Colorless | 0.015 | 0.015 | 0.015 | 0.015 | 0.016 | 0.050 | 0.023 | 0.046 |

Eight color pairs can be obtained according to Table 5, eight color pairs include a color pair of royal blue and blue, a color pair of blue and green, a color pair of cyan and green, a color pair of green and deep red, a color pair of amber and deep red, a color pair of red-orange and deep red, a color pair of red and red-orange, and a color pair of deep red and deep red.

Any two color pairs, which are selected from the eight color pairs and which meet that matrix element corresponding to the two color pairs in Table 5 is greater than 0.3, can be used as the first LED light source 602 and the second LED light source 606, and the first LED light source 604 and the second LED light source 608 in the multicolor visible light communication system shown in FIG. 6. It should be noted that the multicolor visible light communication system shown in FIG. 6 is only an embodiment of the visible light communication system including two LED-LED links. In practice, three, four, or more LED-LED links may be built in the multicolor visible light communication system, as long as the colors of the LED light sources in the multiple LED-LED links are different color pairs of the eight color pairs and meet that the matrix element corresponding to the colors of the LED light sources in the multiple LED-LED links in Table 5 is greater than 0.3.

In the multicolor visible light communication system shown in FIG. 6, the first LED light source 602 is configured as a red LED light source, the second LED light source 606 is configured as a red LED light source, the first LED light source 604 is configured as a blue LED light source, and the second LED light source 608 is configured as a green LED light source. Without any equalization and amplification circuits, a simple on-off keying modulation (OOK) is adopted in the multicolor visible light communication system to provide a data rate of 40 to 200 kbps, meeting the requirement of the narrowband internet of things (NB-IoT). A block diagram of a full-duplex visible light communication system as shown in FIG. 7 is obtained, applied to a two-way narrowband internet of things application scenario.

Figure 7:
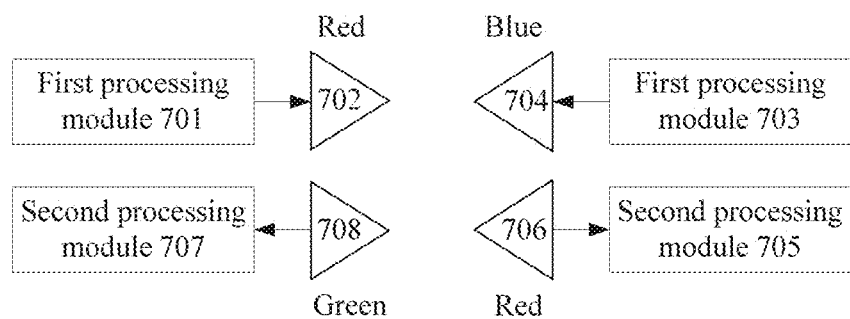
FIG. 7 is a block diagram of a full-duplex visible light communication system according to the present disclosure.

FIG. 7 shows a block diagram of a full-duplex visible light communication system. A forward link is a link from a red LED to a red LED, and a reverse link a link from a blue LED to a green LED. An OOK signal is generated by any waveform generator and is sent by a transmitting LED, the bias voltage $V_{dc}$=8V, and the peak-to-peak value $V_{pp}$=1V. A signal received by the receiving LED is recorded by the oscilloscope, and a bit error rate is calculated offline.

Figure 8:
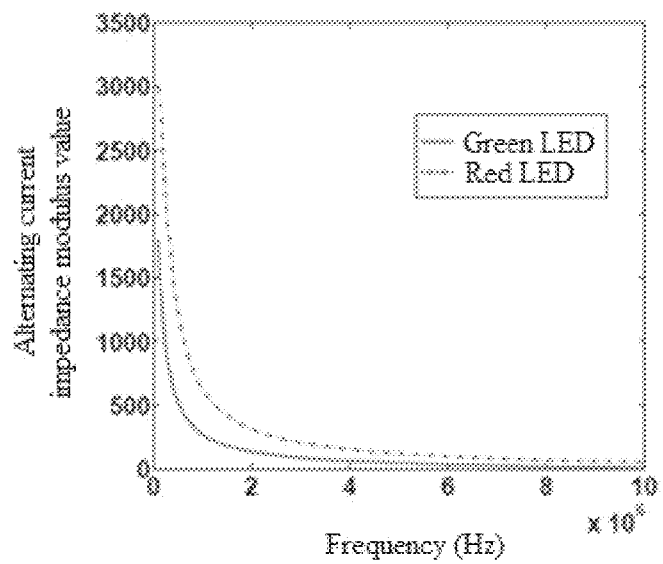
FIG. 8 is an alternating current impedance spectrum in a case that a red LED and a green LED are used as light receivers according to the present disclosure.
Figure 9:
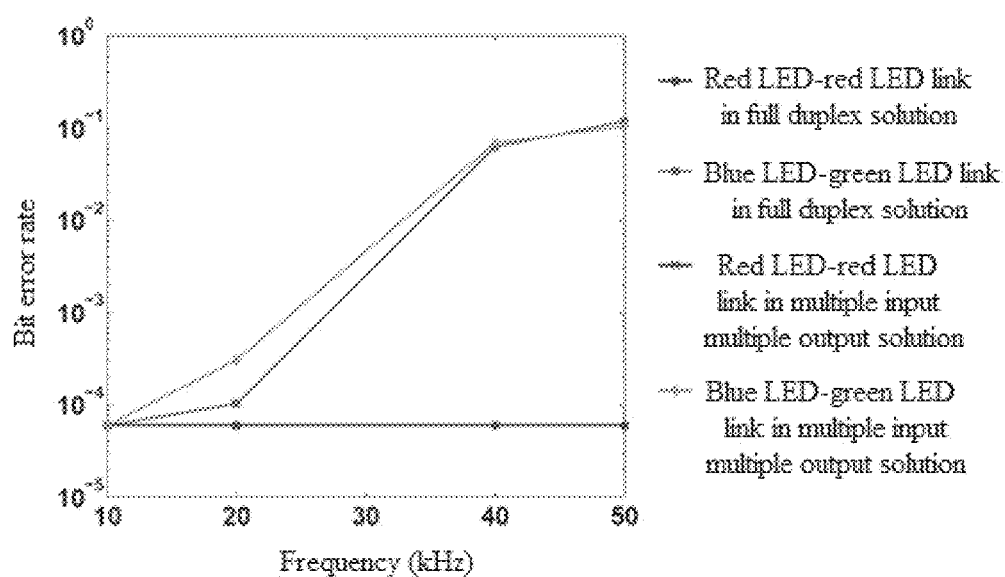
FIG. 9 is a schematic diagram showing a relationship between a bit error rate and a communication rate according to the present disclosure.
Figure 10:
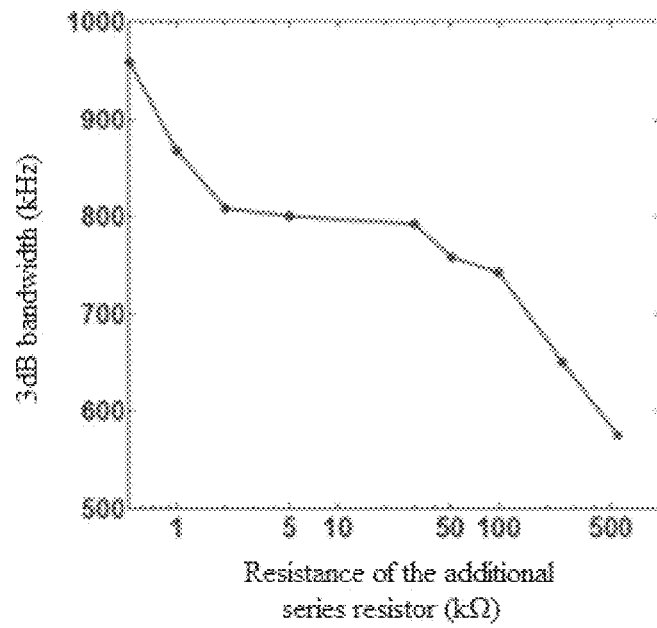
FIG. 10 is a schematic diagram showing a relationship between a 3 dB bandwidth and a resistance of an additional series resistor at a receiving terminal of a red LED-red LED visible light communication link according to the present disclosure.

The red LED and the green LED are used as receiving terminals. If an impedance of the receiving terminal does not match an impedance of the oscilloscope, strength of a received signal is to be affected. FIG. 8 shows an alternating current impedance spectrum in a case that a red LED and a green LED are used as light receivers, where an abscissa represents frequency and an ordinate represents an alternating current impedance modulus value. FIG. 8 shows the impedance of the red LED and the green LED measured by a network analyzer. Real part of the impedance is resistance. In order to convert a current outputted by an LED into a larger voltage, an input impedance of the oscilloscope is equal to 1 MΩ instead of 50Ω. It can be seen from FIG. 8 that the green LED has a smaller resistance than the red LED, and thus is more affected by impedance mismatch. FIG. 9 shows a relationship between a bit error rate and a frequency, where an abscissa represents the frequency and an ordinate represents the bit error rate. FIG. 9 shows bit error rate performance from a data rate of 10 kbps to 50 kbps. The minimum error displayed in R-R is determined by the number of transmitted bits (16384), and B-G has a higher bit error rate. According to this characteristic, in order to improve bandwidth and transmission performance of the link, the LED may be connected to an amplification circuit with an adjustable impedance. FIG. 10 is a schematic diagram showing a relationship between a 3 dB bandwidth and a resistance of an additional series resistor at a receiving terminal of a red LED-red LED visible light communication link, where an abscissa represents the resistance of the additional series resistor at the receiving terminal and an ordinate represents the 3 dB bandwidth. The experimental data shown in FIG. 10 shows that the data rate can be significantly improved by a circuit with adjustable impedance, thereby improving the bandwidth and transmission performance of the link.

According to the embodiment, a full-duplex multicolor visible light communication system including multiple LED-LED links can be established. By using the light spectrum selectivity of the LED light source, optical filters are not required in the multicolor visible light communication system, thereby reducing the cost of establishing the multicolor visible light communication system and simplifying the structure. In addition, LED-LED links with multiple color pairs have different color pairs, thus the communication rate of the communication system can be increased.

Figure 11:
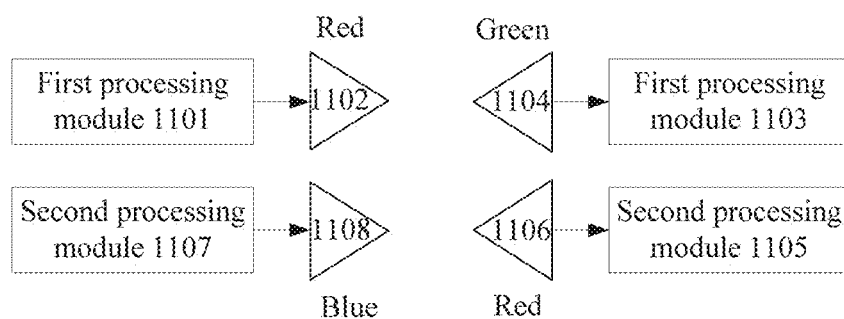
FIG. 11 is a block diagram of a multicolor visible light communication system according to another embodiment of the present disclosure.

Reference is made to FIG. 11, which shows a block diagram of a multicolor visible light communication system according to another embodiment. The multicolor visible light communication system is a half-duplex 2×2 MIMO LED-LED visible light communication system including two RGB LED array modules. Ignoring interference between colors, without any equalization and amplification circuits, a simple on-off keying modulation (OOK) is adopted in the system to provide a data rate of 40 to 200 kbps, meeting the requirement of the narrowband internet of things (NB-IoT). Therefore, the multicolor visible light communication system can be applied to a low-complexity narrowband internet of things.

As shown in FIG. 9, a rate of a MIMO visible light communication link including an R-R LED link and a B-G LED link can reach 80 kbps without any amplification and equalization circuit. Based on the research of photodetectors based on light-emitting diode, in addition to significantly improving the performance by an amplification circuit with a matched impedance, a balance between the signal-to-noise ratio and the bandwidth can be achieved by adaptively adjusting the series impedance, for convert the signal current to the signal voltage, at the receiving LED. The multicolor visible light communication system shown in FIG. 11 can be extended to include more color LEDs, organic LEDs, and quantum dot LEDs.

According to the embodiment, the multicolor MIMO VLC, established based on the characteristics that different LEDs have different wavelength-selective response spectrum, has great potential. With the multicolor LED-LED MIMO VLC system, degree of freedom in light spectrum can be effectively used to improve communication performance. In addition, since no optical filter is required, the cost can be greatly reduced and the practicability of the system can be improved.

Figure 12:
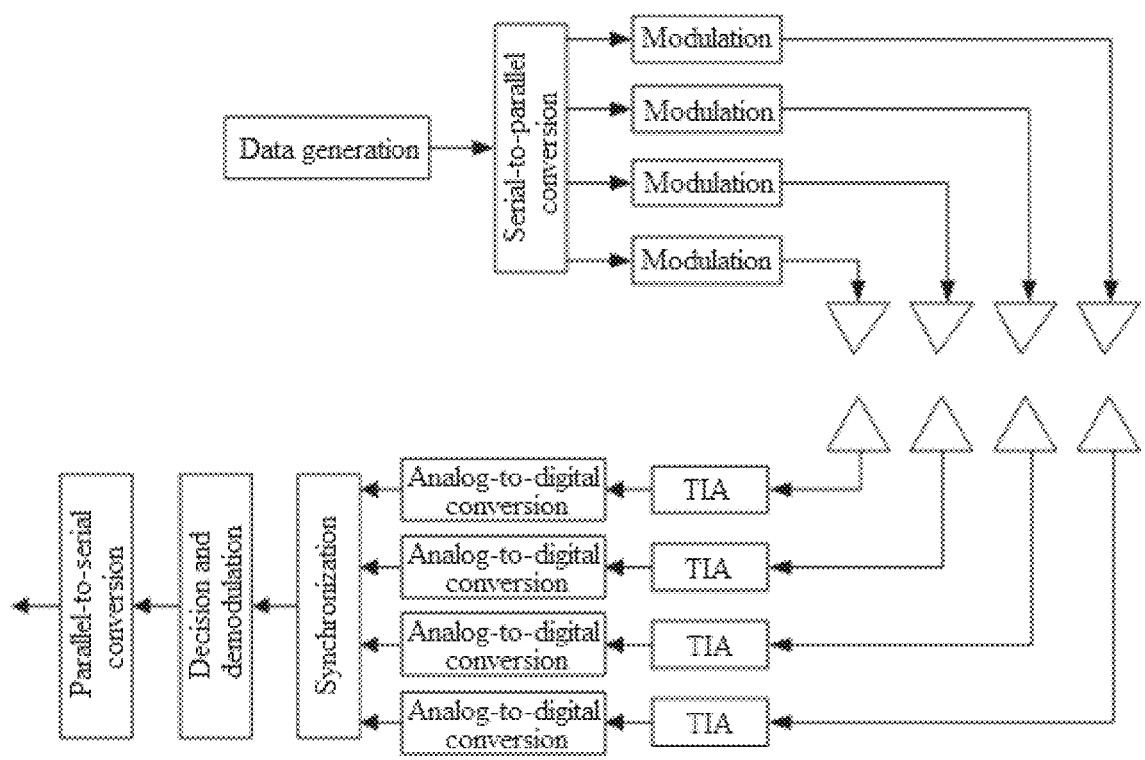
FIG. 12 is a block diagram of a 4×4 multicolor LED MIMO communication system including four pairs of LEDs according to the present disclosure.
Figure 13A:
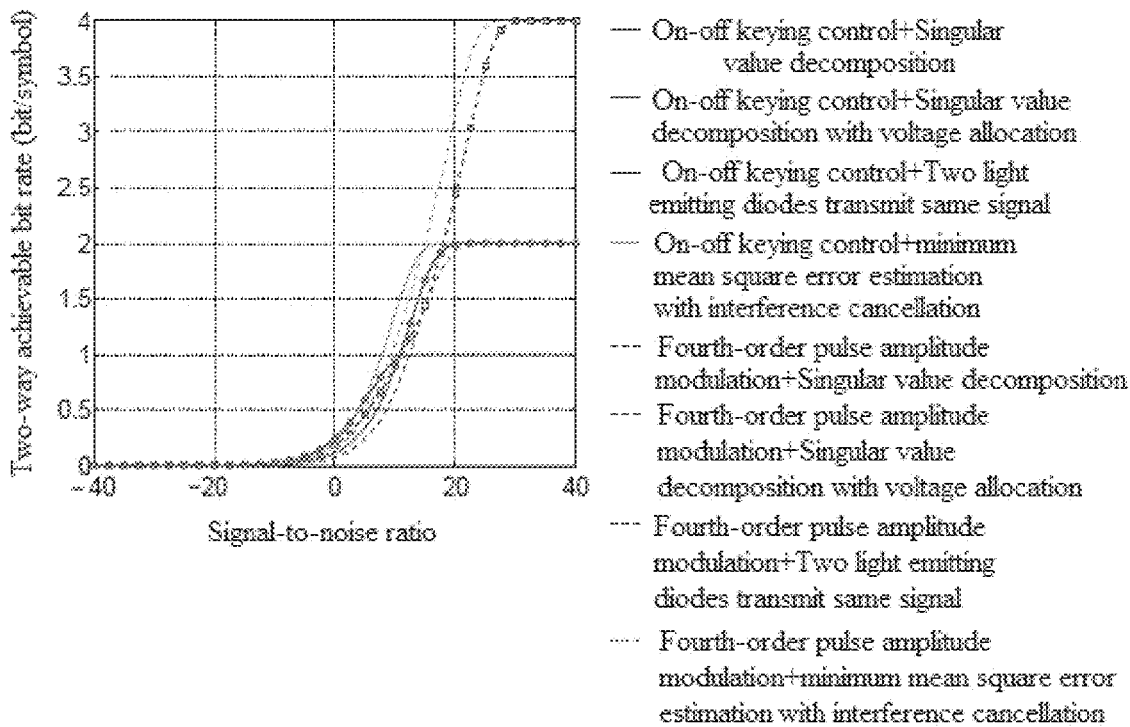
FIG. 13(a) is a schematic diagram of an achievable bit rate of singular value decomposition with voltage allocation at an interference ratio being 0.1 according to the present disclosure.
Figure 13B:
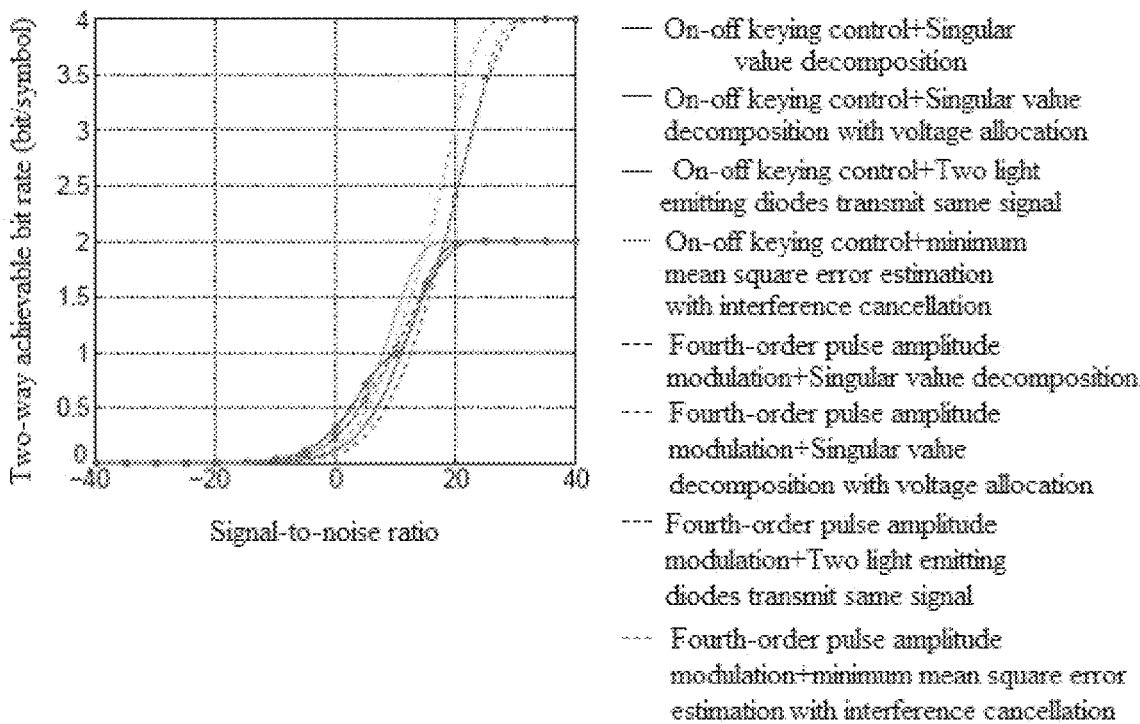
FIG. 13(b) is a schematic diagram of an achievable bit rate of singular value decomposition with voltage allocation at an interference ratio being 0.3 according to the present disclosure.
Figure 13C:
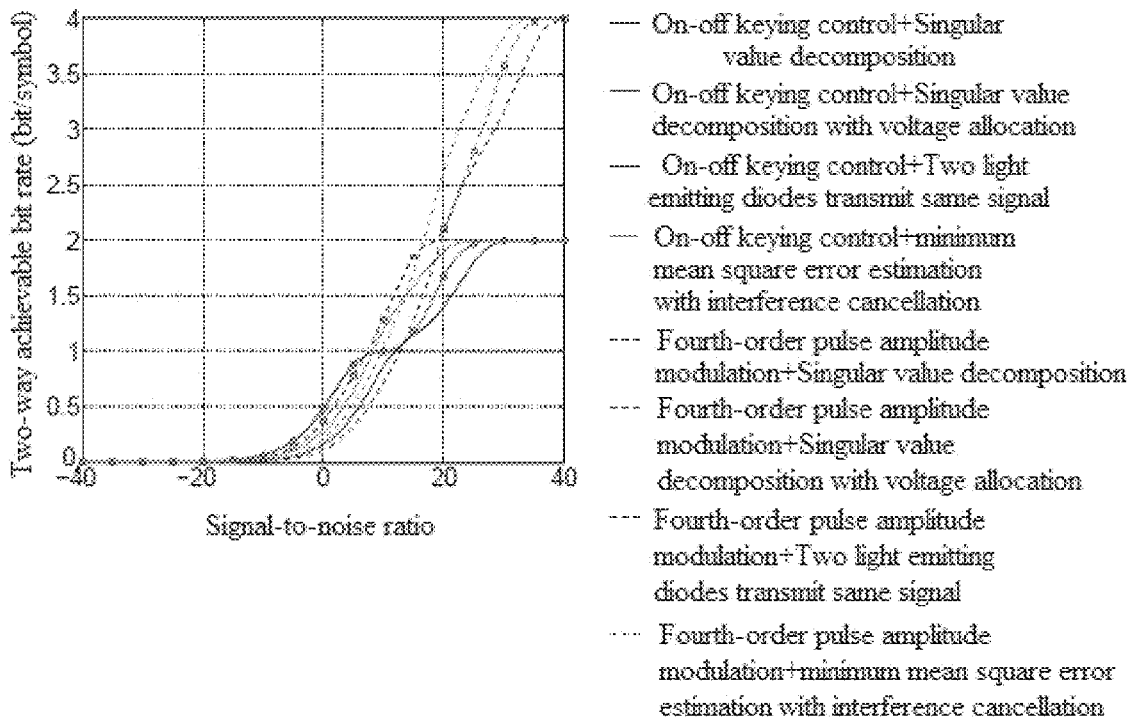
FIG. 13(c) is a schematic diagram of an achievable bit rate of singular value decomposition with voltage allocation at an interference ratio being 0.7 according to the present disclosure.
Figure 13D:
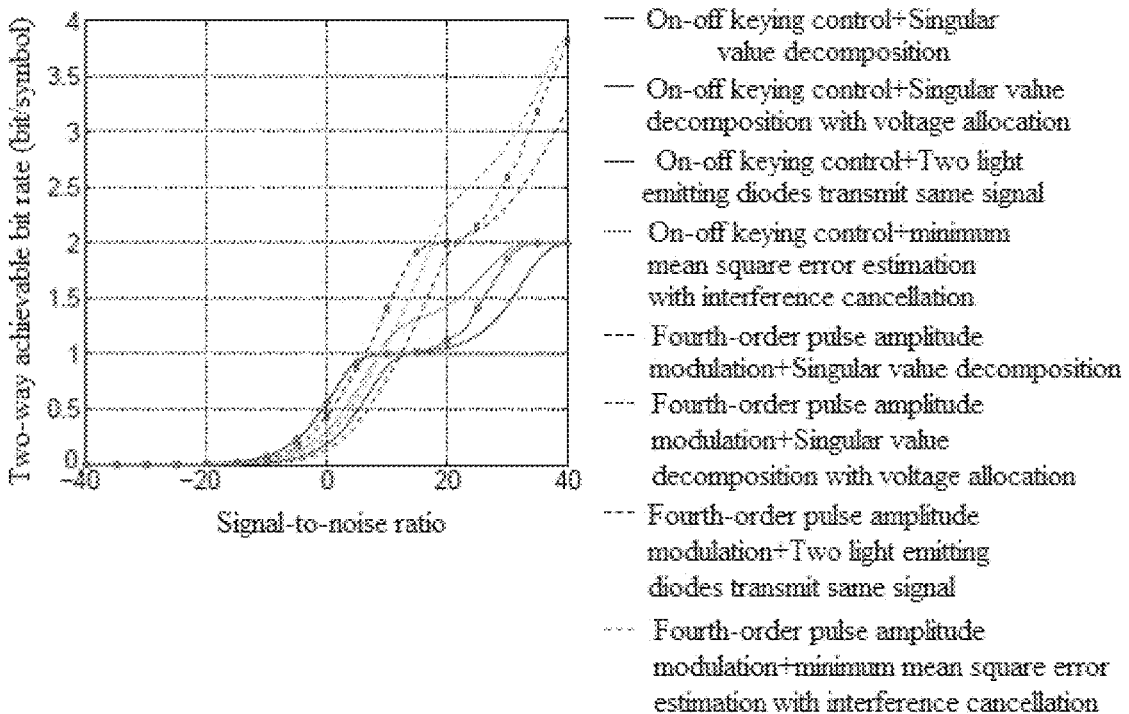
FIG. 13(d) is a schematic diagram of an achievable bit rate of singular value decomposition with voltage allocation at an interference ratio being 0.9 according to the present disclosure.

Reference is made to FIG. 12, which shows a block diagram of a 4×4 multicolor LED MIMO communication system including four pairs of LEDs.

Without any equalization and channel coding, a rate of a single-point to single-point OOK modulation by using an LED as a receiving terminal, which is tested offline, can reach 30 Mbps, and the bit error rate is less than $10^{-3}$. According to the results of the light spectrum selectivity of the response between different LEDs shown in Table 5, the LED light receiver can be regarded as a narrow-spectrum light detector without an optical filter. In establishing an LED-LED MIMO VLC, if an LED light source having a narrow beam angle is selected, an angle away from an LED normal direction increases, thus light intensity decreases rapidly. Therefore, LEDs with close wavelengths are separated in space by adjusting arrangement of the transmitting terminal and the receiving terminal to further reduce interference, thereby reducing the effect between different LEDs to a small extent, and more easily and effectively eliminating the interference in a case of using wavelength division multiplexing.

Therefore, the asymmetric multicolor duplex visible light communication system as shown in FIG. 12 is designed to eliminate the synchronization problem caused by the different bandwidths of different LEDs and color interference between different LEDs. Based on the experimentally measured channel matrix shown in Table 5 and frequency spectrum response curve, four color pairs of LEDs are selected from the channel matrix shown in Table 5 as the transmitting and receiving LED pairs, and the channel matrix is a 4×4 MIMO visible light communication system including a block diagonal matrix. The 4×4 MIMO communication system can be simplified into two independent 2×2 MIMO systems, and the LEDs in each of the MIMO systems have the same rate, that is, there is no unequal rate reception synchronization problem. In addition, different LEDs are adopted at the transmitting and receiving LED terminals of the blue and green light parts, and the same LEDs are adopted at the transmitting and receiving LED terminals of the red light part which has symmetry. Therefore, a duplex communication mode with asymmetric uplink and downlink is designed. The blue light part is used only for downlink. The red light part operates in a time-division multiplex uplink and downlink mode, and feedback is sent in uplink.

In order to further reduce the cost of LED-LED MIMO visible light communication, a low-complexity MIMO transmission and reception strategy is adopted according to the embodiment. In visible light communication, constraint on the transmitting LED is usually a peak constraint caused by the limitation of the linear region of the LED, rather than a total power constraint or a single antenna constraint in the conventional wireless communication MIMO system. Therefore, corresponding adjustments are required to be performed on some of the MIMO transmission and reception technologies according to the embodiment. According to the embodiment, the effect of peak limitation on SVD decomposition is studied, and the effects of SVD decomposition and MMSE-SIC on channel capacity under OOK and 4PAM modulation are compared in different inter-lamp interference if there are two transmitters and two receivers. The effect of voltage allocation for the transmitting LED on the capacity is further analyzed, and an optimal transmitter-receiver strategy is proposed based on a low complexity combination of feeding back a signal-to-noise ratio estimated by the receiver to the transmitting terminal and selecting a communication mode of transmitting by using antenna.

FIG. 13 shows a schematic diagram of an achievable bit rate of singular value decomposition with voltage allocation in a 2×2 LED-LED MIMO visible light communication system at different symmetrical color interference. FIG. 13(a) shows a schematic diagram of the two-way achievable bit rate of singular value decomposition with voltage allocation at an interference ratio being 0.1, where an abscissa represents the signal-to-noise ratio and an ordinate represents the two-way achievable bit rate. FIG. 13(b) shows a schematic diagram of the two-way achievable bit rate of singular value decomposition with voltage allocation at the interference ratio being 0.3, where the abscissa represents the signal-to-noise ratio and the ordinate represents the two-way achievable bit rate. FIG. 13(c) shows a schematic diagram of the two-way achievable bit rate of singular value decomposition with voltage allocation at the interference ratio being 0.7, where the abscissa represents the signal-to-noise ratio and the ordinate represents the two-way achievable bit rate. FIG. 13(d) shows a schematic diagram of the two-way achievable bit rate of singular value decomposition with voltage allocation at the interference ratio being 0.9, where the abscissa represents the signal-to-noise ratio and the ordinate represents the two-way achievable bit rate. According to an optimal strategy at different interference ratios, after an optimal modulation mode and MIMO algorithm are determined and after data input, serial-to-parallel conversion, and modulation are performed, a signal is sent to the transmitting LED via a Bias-T and a merge of bias and drive. An optical signal is converted into a current signal by the receiving LED, and signal amplification and analog-to-digital conversion is performed on the current signal, then synchronization, decision and demodulation, and parallel-to-serial conversion are performed by an FPGA chip, and finally data is outputted.

It should be noted that the multiple input multiple output multicolor visible light communication system shown in FIG. 12, including 4 pairs of LEDs, is only an embodiment of the multiple input multiple output multicolor visible light communication system. In practice, the multiple input multiple output multicolor visible light communication system may include a number of pairs of LEDS other than 4 pairs of LEDs. The specific structure of the multiple input multiple output multicolor visible light communication system is not limited in the embodiment.

According to the embodiment, an asymmetric multicolor visible light communication system is provided. An asymmetric duplex communication mode is adopted in the visible light communication system to eliminate the synchronization problem caused by the different bandwidths of different LEDs and color interference between different LEDs. In addition, an optimal transmitter-receiver strategy, based on a low complexity combination of feeding back a signal-to-noise ratio estimated by the receiver to the transmitting terminal and selecting a communication mode of transmitting by using antenna, is adopted in the multicolor visible light communication system according to the embodiment, thereby reducing the cost of the multicolor visible light communication system in the embodiment.

In a case that a light emitting diode is used as an optical signal transmitting terminal, a bias driving current affects a light emitting efficiency and the electro-optical response frequency spectrum of the light emitting diode. A greater driving current results in a lower light emitting efficiency and a higher bandwidth. For different types of blue light emitting diodes made of the same material, a logarithm of the 3 dB modulation bandwidth and the light emitting efficiency are approximately located on a straight line with a negative slope. A bias voltage affects a strength of an alternating current signal actually loaded on the light emitting diode. The strength of the alternating current signal actually loaded on the light emitting diode is in a linear relationship with the voltage division between an impedance of the LED at a corresponding voltage and an output impedance of a biaser. In a case that the light emitting diode is used as a receiving terminal, the photoelectric response spectrum of the light emitting diode is related to a background optical power. An increase in the optical power results in a decrease in response bandwidth. By performing an equivalent circuit analysis on the light emitting diode in a case of using the light emitting diode as an optical signal detector, it is found that a larger average power value of an optical signal indicates a larger junction capacitance, a smaller leakage resistance, and a relative smaller output alternating current signal.

In visible light communication links, for a link from the light emitting diode to a photodiode, the optical power at the receiving terminal can be enhanced by shortening the distance between the transmitting terminal and the receiving terminal to enhance the signal-to-noise ratio, thereby achieving the purpose of increasing the communication rate. However, in a case of using an LED to transmit an optical signal and using an LED to receive an optical signal simultaneously, unlike using the photodiode as the receiving terminal, signal waveform is distorted as the distance between the transmitting terminal and the receiving terminal is shortened. This phenomenon is not caused by a saturation of the LED light receiver, but caused by the decrease in the bandwidth of the receiving LED as the optical power at the receiving terminal increases. According to the embodiment, an LED dispersion carrier model is modified by analyzing physical mechanism based on which the bandwidth of the LED changes with the change of the optical power, and comparison with experiment results and analysis are performed, thereby obtaining a better matching result. As a detector, the effect of non-linear of the LED on communication is reflected in bandwidth and signal-to-noise ratio. The effects of the signal-to-noise ratio and inter-symbol interference (bandwidth) on the achievable rate in different modulation modes at different optical powers are simulated according to the embodiment. Different modulation modes corresponding to different optimal optical power operating points. Therefore, the communication rate can be improved under the condition that the optical power is limited or the modulation mode is determined according to the embodiment. In the case of a fixed modulation depth, a low average optical power causes the LED-LED link to have a high bandwidth, a low signal-to-noise ratio, and a better low-order modulation performance; a high average optical power causes a low bandwidth and a high signal-to-noise ratio, and a better higher-order modulation performance. Therefore, according to this characteristic of the LED-LED optical communication link, the modulation order is adaptively adjusted based on the changes in the average optical power caused by changes in the distance and azimuth of the LED-LED link according to the embodiment.

The method for adaptively adjusting the modulation order based on the changes in the average optical power, caused by changes in the distance and azimuth of the LED-LED link, may be applied to the visible light communication systems according to the second embodiment and the fifth embodiment.

Based on the study of the effect of the signal-to-noise ratio and the inter-symbol interference at different optical powers on the achievable rate of different modulation modes according to the embodiment, a theory is found that if the low-order modulation is adopted at a low average optical power and the higher-order modulation is adopted at a high average optical power, a higher achievable rate may be achieved. The determined theory is applied to the visible light communication systems according to the second embodiment to the fifth embodiment, the modulation order can be adaptively adjusted according to the optical power, so that the visible light communication system can achieve a higher communication rate.

With the above descriptions of the disclosed embodiments, the skilled in the art may practice or use the present disclosure. Various modifications to the embodiments are apparent for the skilled in the art. The general principle disclosed herein can be implemented in other embodiments without departing from the spirit or scope of the disclosure. Therefore, the present disclosure should not be limited to the embodiments disclosed herein, but has the widest scope that is conformity with the principle and the novel features disclosed herein.

The invention claimed is:

1. A visible light communication transceiver, comprising: a light emitting diode (LED) light source, a Bias Tee circuit, a drive amplification module, and an adaptive amplification and equalization module, wherein
   the LED light source is connected to a radio frequency and direct current hybrid port of the Bias Tee circuit, the drive amplification module is connected in parallel with the adaptive amplification and equalization module, and the drive amplification module and the adaptive amplification and equalization module connected in parallel are connected to a radio frequency port of the Bias Tee circuit,
   the drive amplification module is configured to perform digital-to-analog conversion and amplification on a digital modulation signal to obtain a first electrical signal, and transmit the first electrical signal to the Bias Tee circuit via the radio frequency port,
   the Bias Tee circuit is configured to transmit the first electrical signal to the LED light source via the radio frequency and direct current hybrid port, the LED light source is configured to perform electrical-to-optical conversion on the first electrical signal to generate a first optical signal and transmit the first optical signal, and perform optical-to-electrical conversion on a received second optical signal to obtain a second electrical signal, wherein the second optical signal comprises an optical signal transmitted by a peer terminal, or an optical signal generated by external material excited by the optical signal transmitted by the LED light source, or an optical signal returned after being reflected, wherein a capability of the LED light source for responding to the second optical signal is negatively correlated with an optical power of the first optical signal, the Bias Tee circuit is configured to obtain the second electrical signal from the LED light source, and transmit the second electrical signal to the adaptive amplification and equalization module via the radio frequency port, and the adaptive amplification and equalization module is configured to adjust a gain of the second electrical signal based on the optical power of the first optical signal, to obtain an electrical signal corresponding to the second optical signal.

2. The visible light communication transceiver according to claim 1, wherein the adaptive amplification and equalization module comprises an adaptive gain control circuit and an equalization circuit, wherein if a forward bias voltage of the LED light source is greater than a conversion voltage of the LED light source, a gain coefficient of the adaptive gain control circuit is set to be $e^{[\alpha(V-V_0)]}$, where $V$ represents the forward bias voltage, each of $\alpha$ and $V_0$ represents a constant, if the forward bias voltage of the LED light source is less than the conversion voltage of the LED light source, the gain coefficient of the adaptive gain control circuit is set to be $e^{[\beta V]}$, where $\beta$ represents a constant and the equalization circuit is configured to increase a bandwidth of the second electrical signal.

3. The visible light communication transceiver according to claim 1, wherein the LED light source comprises any one of a monochromatic LED light source, a micron-level LED light source, an organic LED light source and a quantum dot LED light source, or the LED light source comprises any one of an array of monochromatic LED light sources, an array of micron-level LED light sources, an array of organic LED light sources and an array of quantum dot LED light sources.

4. The visible light communication transceiver according to claim 1, wherein two physical processes of the electrical-to-optical conversion and the optical-to-electrical conversion are implemented on the same microstructure of same material.

5. The visible light communication transceiver according to claim 1, wherein the LED light source is capable of receiving an external optical signal when the LED light source performs lighting or displaying.

6. A visible light communication system, comprising two visible light communication transceivers, wherein each of the two visible light communication transceivers is the visible light communication transceiver according to claim 1, and the two visible light communication transceivers communicate with each other by optical signals.

7. The visible light communication system according to claim 6, wherein colors of the LED light sources of the two visible light communication transceivers comprise red and red-orange.

* * * * *